Oct. 19, 1965 L. GRYK 3,213,195

CODEPRINTER APPARATUS

Filed July 13, 1962 6 Sheets-Sheet 1

INVENTOR
LEON GRYK
BY Thomas S. Ross
Joseph R. Spalla
ATTORNEYS

INVENTOR
LEON GRYK

BY Thomas S. Ross
Joseph R. Spalla
ATTORNEYS

INVENTOR
LEON GRYK

Oct. 19, 1965 L. GRYK 3,213,195

CODEPRINTER APPARATUS

Filed July 13, 1962 6 Sheets-Sheet 4

INVENTOR
LEON GRYK

BY Thomas S. Ross
Joseph R. Spalla
ATTORNEYS

INVENTOR
LEON GRYK
BY Thomas S. Ross
Joseph R. Spalla
ATTORNEYS

INVENTOR
LEON GRYK

United States Patent Office 3,213,195 Patented Oct. 19, 1965

3,213,195
CODEPRINTER APPARATUS

Leon Gryk, New Britain, Conn., assignor to Royal McBee Corporation, New York, N.Y., a corporation of New York Filed July 13, 1962, Ser. No. 209,593
13 Claims. (Cl. 178—26)

This invention relates to codeprinter apparatus; more particularly it relates to codeprinter apparatus for typing information represented by code signals characterized by control circuitry operative in response to command or start process signals from a system to initiate the operation of said codeprinter apparatus whereby said information may be processed, and operative in turn by signals generated internally in the codeprinter apparatus to issue control signals to the system whereby subsequent command and code signals can be generated.

Apparatus in accordance with the invention is adapted for operation in a system comprising one or more source units, e.g. program and data record readers, and keyboards, and one or more slave units, e.g. record perforators and codeprinter apparatuses.

In accordance with such a system which is generally illustrated in FIGURE 1 and which employs an eight bit code, all source units 8 have their outputs connected to common bit lines 9 which are connected to a buffer storage unit 10 (FIGURE 3) within system timing and control circuitry 11. Bit and inverted bit signals from the buffer unit are employed to operate a common translator (FIGURE 3) which feeds a control matrix in the system timing and control circuitry and solenoid matrices (FIGURE 4) of printers in codeprinter apparatus slave units 12 via lines 13. The bit signals from the buffer unit are also connected directly to record perforating slave units 12 over lines 14. The selective connection of a source unit with one or more slave units is effected by the control circuitry in response to control code information. More specifically control code information issued by a program source is decoded by the translator and control matrix in the system control circuitry whereby selected source and slave units are turned "on" over "unit on" lines 15 and whereby a start search signal is issued to the selected source unit. The selected source upon receipt of a start search signal is permitted to simultaneously emit a search complete signal to the system control circuitry and coded information to the buffer storage unit which stores the information until reset. In response to the search complete signal the system control circuitry generates a start process signal on line 16 which permts selected slave units to process the data stored in the buffers at their own rates. After the slowest operating slave has processed the data a slave in process signal via line 17 issues to and is effective within the system control circuitry to generate a process complete signal which is operative to reset the buffers and, after a delay, to initiate another start search signal to the selected source whereby subsequent data issued by the selected source unit may be processed by selected slave units. When the source is a reader subsequent data and a search complete signal automatically issues therefrom. When the source is a keyboard, subsequent data issues therefrom when a key is depressed. The processing of data between selected source and slave units continues until the selected source emits information effective on the system control circuitry to return control to the program source which may act as the source in charge or issue control information thereby to select another combination of source and slave or slave units.

As is apparent from the above, selected source and slave units "talk to" one another via the system control circuitry on a two line basis; the selected source units emitting code signals in response to a start search signal from the system and informing the system by a search complete signal that the code signals have been emitted, and the slave units, several of which may be operated from a single source, processing code signals at the rate of the slowest operating slave in response to start process signals and informing the system that the code signals have been processed.

Briefly, a slave unit or codeprinter apparatus in accordance with the invention comprises a printer in the form of a conventional electric typewriter provided with solenoids adapted to initiate typewriter operation, a printer-in-process flip flop, and an escapement controlled feedback generator. Included with the codeprinter apparatus is printer control circuitry comprising a slave-in-process flip flop operable to a set condition in response to a start process signal, and a probe signal generator responsive to the setting of the slave-in-process flip flop. The slave-in-process flip flop when set reverses the state of the slave-in-process line 17, the reversal of which indicates that a slave unit is in process. The probe signal generated, if translated code signals emitted from a source represent data to be processed by the codeprinter, is effective to energize a discrete solenoid and to set the printer-in-process flip flop. The latter is reset in response to a feedback signal, and when reset is effective to reset the slave-in-process flip flop whereupon its output state informs the system via the slave-in-process output line 17 of the fact that subsequent code signals may be issued to the codeprinter apparatus. When the code signals represent nonprinter functions the printer-in-process flip flop is not set and the slave-in-process flip flop is reset by the trailing edge of the probe signal whereby the nonprinter function code signals may be processed at the rate of faster acting slaves.

A feature of the invention resides in the fact that when a printer fails to function properly as determined by the absence of an output from its escapement controlled feedback generator, the printer control circuitry automatically issues another probe signal to the printer.

A further feature of the invention resides in the fact that several printers may be controlled by common printer control circuitry and the several printers so controlled may be served by a common system code translator.

An object of the invention is to provide codeprinter apparatus adapted for on line operation at an optimum rate with with other types of slave units having faster operating rates.

Another object of the invention is in the provision of codeprinter apparatus which can process data on command and which issues system control signals after processing the data.

Another object of the invention is in the provision of printer control circuitry for controlling one or more printers and for automatically recalling a printer which has not functioned.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 2:
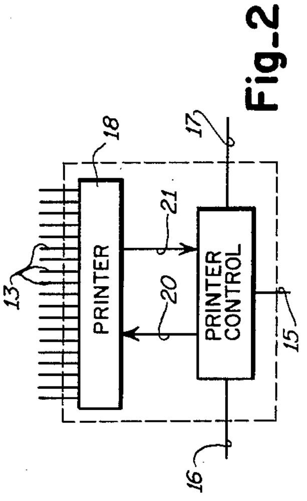
FIGURE 2 is a block diagram of codeprinter apparatus including a single printer.
Figure 3:
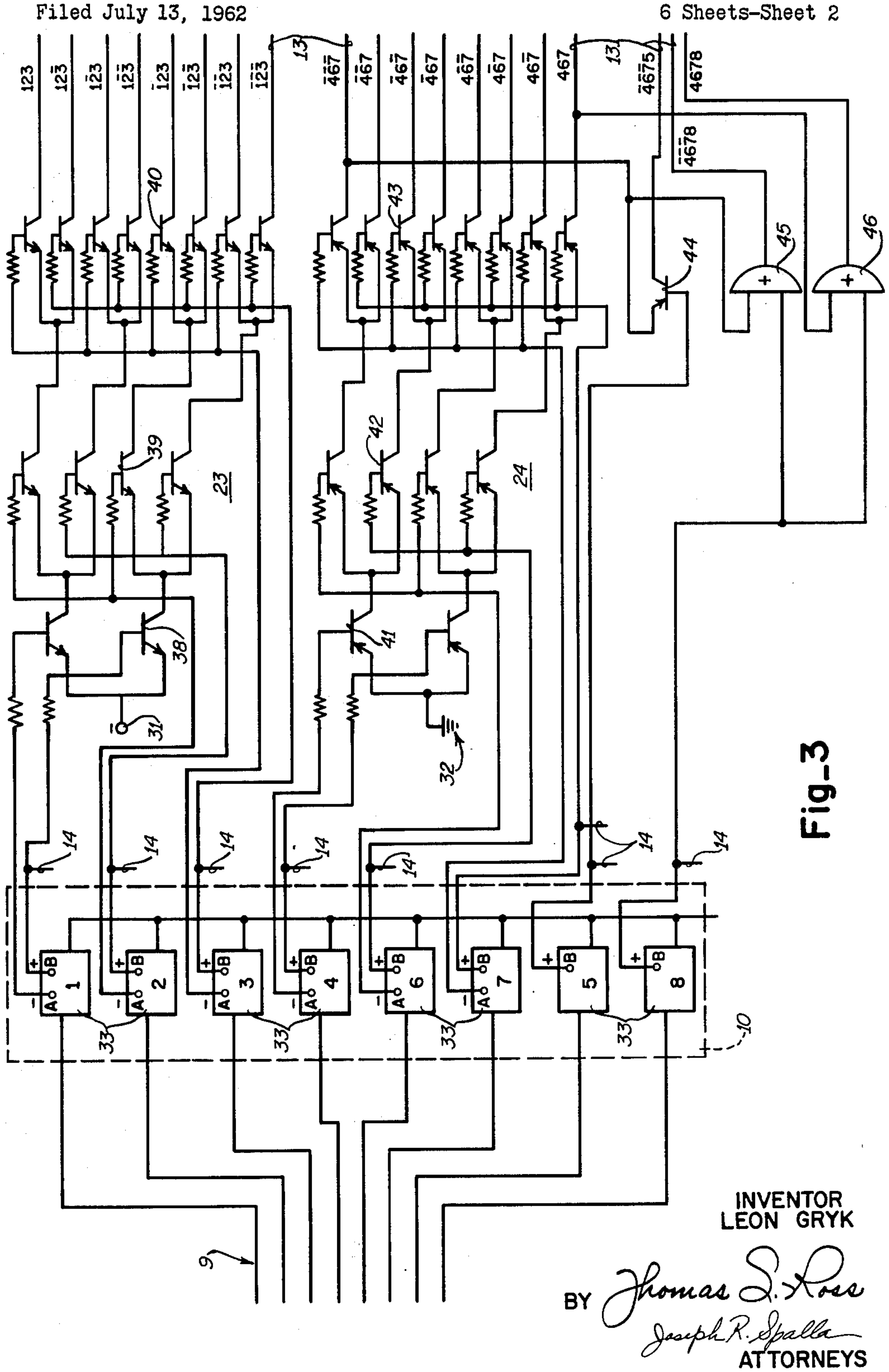
Figure 4:
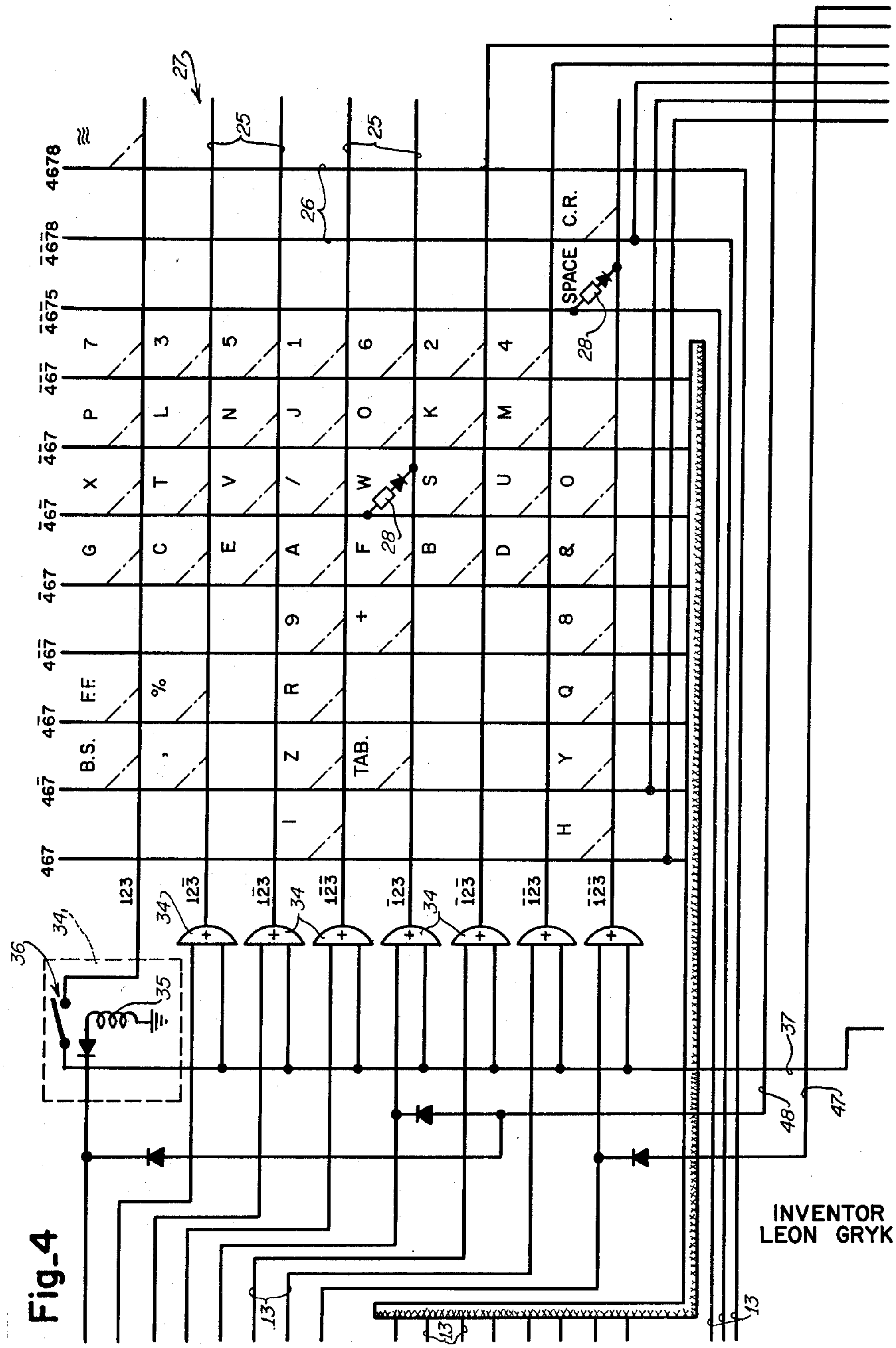
Figure 5:
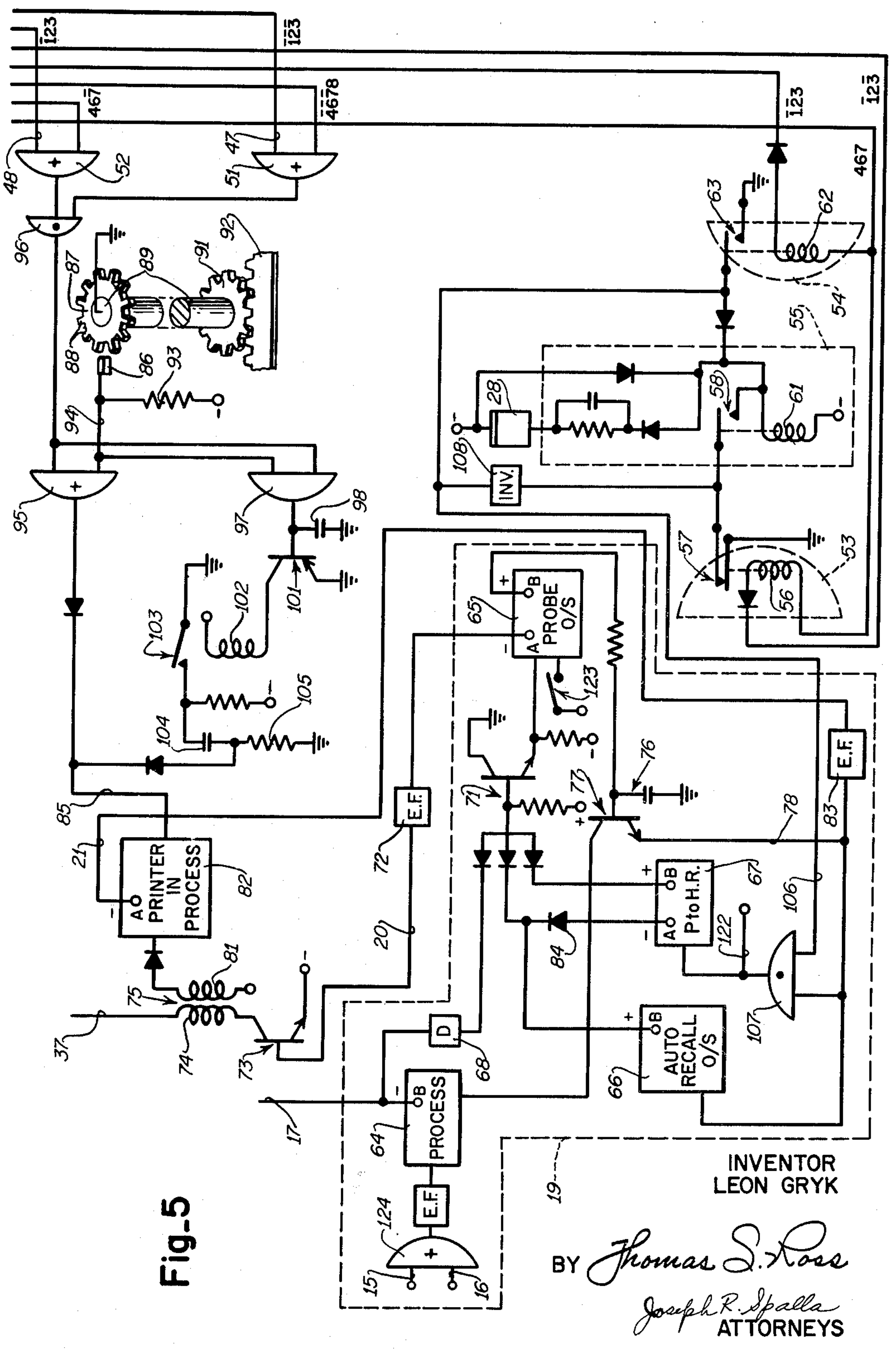
Figure 6:
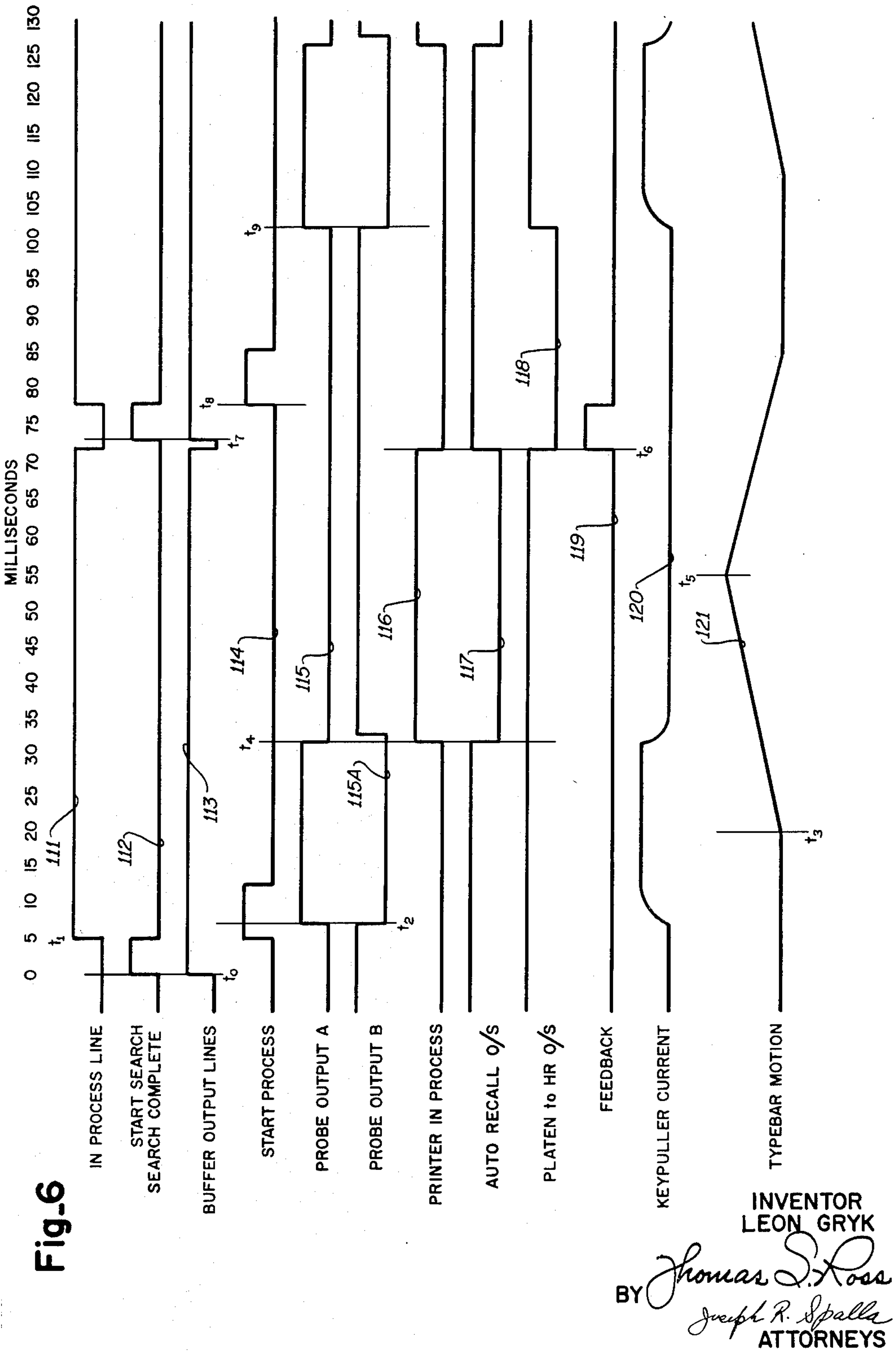
Figure 7:
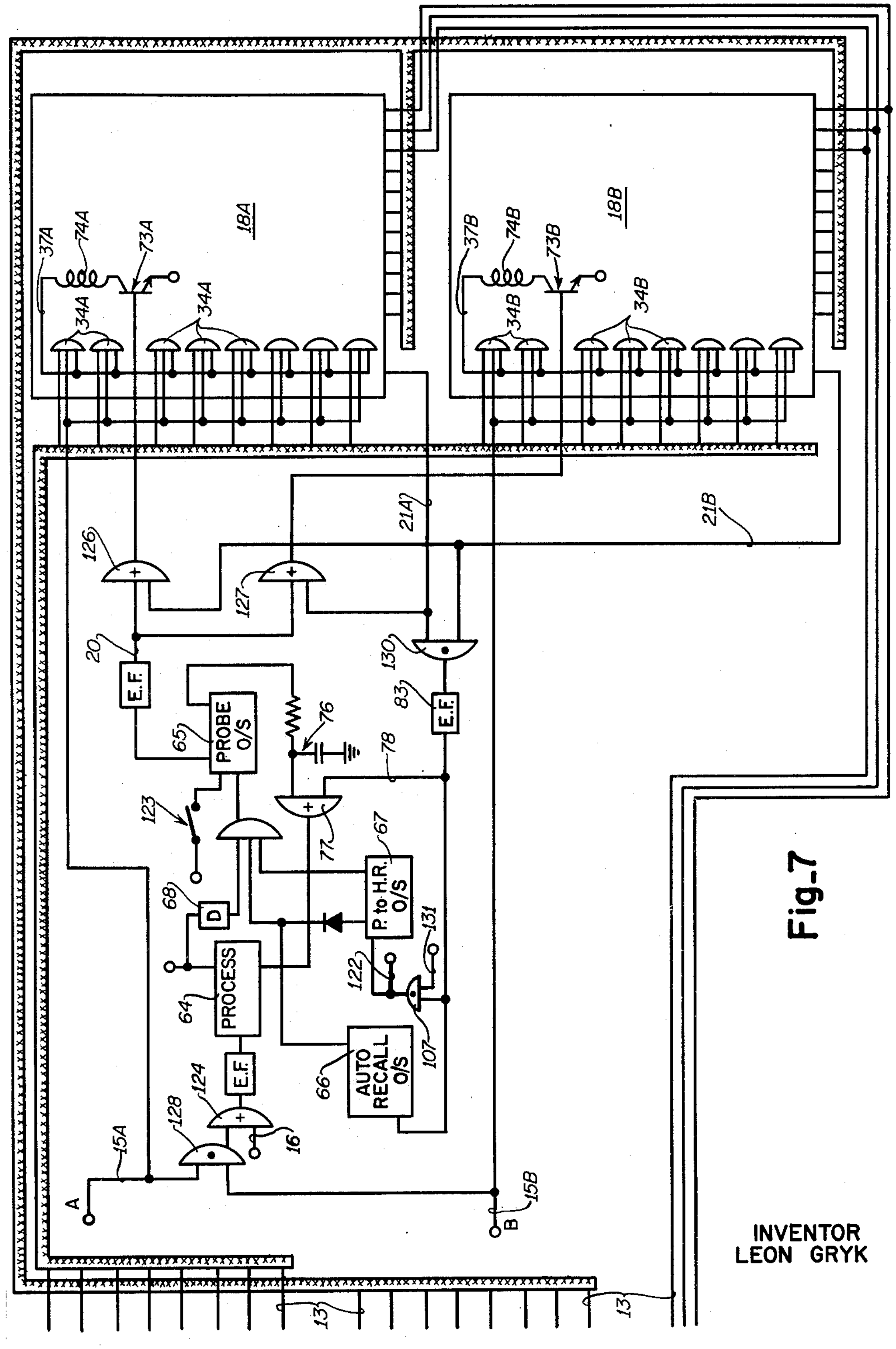

FIGURES 3–5 taken together are a block schematic of the codeprinter apparatus shown in FIGURE 2;

FIGURE 6 is a timing diagram showing the operation of the codeprinter apparatus; and FIGURE 7 is a block schematic diagram of codeprinter apparatus including two printers.

Referring now to the drawings wherein like reference characters designate like or corresponding parts throughout the several views and in particular to FIGURE 2 a slave unit 12 in accordance with the invention comprises codeprinter apparatus operable at a 10 character per second average rate in response to signals from 50 character per second readers or in response to signals issued from a manually operated keyboard. The codeprinter apparatus includes a printer 18 in the form of a conventional electric typewriter less keyboard adapted to be automatically operated by a bank of solenoids connected in a matrix in the printer. Each solenoid, when energized as will be later explained, is adapted to initiate a discrete typewriter operation. The printer matrices as hereinbefore stated are operable from a translator in the system timing and control circuitry whereby the codes set in flip flops comprising the buffer storage unit 10, the function of which is to statically store the code signals issued via bit lines 9 by a selected source unit 8 until the codeprinter apparatus or other slave unit has processed them, are decoded to effect the selection of a discrete solenoid in the printer matrices. The codeprinter apparatus shown in FIGURE 2, includes printer control circuitry 19 which, if an "on" signal is applied thereto via line 15, if a start process signal is present on line 16; and if the signals on lines 9 represent information to be processed by a slave unit and in particular by the codeprinter apparatus, will cause a signal over a probe line 20 to energize a discrete solenoid selected by the common system translator and a printer matrix whereby the information on lines 13 will be processed.

While the printer 18 is functioning a printer-in-process signal on line 21 will prevent the printer control circuitry from issuing a system control signal via slave-in-process line 17. When the printer-in-process signal terminates the system control signal will be generated.

In accordance with the invention, a well known eight bit code is employed wherein typewriter alpha, numeric, and machine functions, with the exception of null ( ≿ ), space, and carriage return, are represented by combinations of six binary digits comprising digits 1, 2, 3, 4, 6 and 7, a 5 digit being a check bit to render even bit combinations odd. Basically then a six level decoder is required with added provision for decoding the null, space, and carriage return codes which are represented by combinations of all eight binary digits carried by lines 9. For reasons of economy, rather than providing a decoder in the system timing and control circuitry and decoders in each printer, decoding is accomplished by a common translator feeding parallel matrices in the system timing and control circuitry and in the codeprinter apparatus. As shown in FIGURES 3 and 4, to which reference is now directed, the common six level decoder translator comprises two three digit translators, generally designated by reference numerals 23 and 24 (FIGURE 3), the eight output lines from each being connected respectively to row 25 and column 26 (FIGURE 4) conductors comprising a conductor matrix generally designated by reference numeral 27 (FIGURE 4) wherein, in the case of a codeprinter apparatus, keypuller solenoids 28 are selectively connected.

With particular reference to FIGURE 3 the three digit translators preferably comprise transistor pyramids. Translator 23 comprises an NPN transistor pyramid adapted to translate 123 bit signal combinations and translator 24 a PNP transistor pyramid adapted to translate 467 bit signal combinations, each pyramid having 1, 2 and 4 pairs of transistors associated with the 123 and with the 467 code bits respectively. The emitters of the transistor pair comprising the lowest bit level of the PNP pyramid are connected to a negative potential source 31 and their collectors are each connected to the emitters of a pair of transistors in the next higher level, etc.; the collectors of the highest level transistors are connected to ground as will hereinafter appear. The same emitter collector connections obtain in the PNP pyramid with the exception that the emitters of the transistor pair comprising the lowest bit level thereof are connected to a positive potential level or ground terminal 32 and the collectors of the transistors in highest bit level are connected to a negative potential as will hereinafter appear.

As shown in FIGURE 3 each of the eight code lines 9 from a source unit is connected to the set terminal of an associated buffer flip flop 33 whereby the code on the lines 9 may be statically stored. As hereinbefore stated slave units, such as perforators, which are required to reproduce code bits will have their bit selecting solenoids connected to lines 14 connected to the B output terminals of the flip flops, while both outputs (A and B) of each of the 1, 2, 3, 4, 6 and 7 buffer flip flops 33, from which opposite polarity signals necessary to operate the common transistor translator associated with the system control matrix and matrices of printers in the codeprinter apparatus, are connected one to one of each of the base terminals of the pairs of associated level transistors and the other to the other of each of the base terminals of pairs of associated level transistors whereby depending on the state of the buffer flip flops 33 a discrete transistor in each pyramid level of the NPN tree will be conductively biased to set up a current path between the negative source 31 and one of its output lines and a discrete transistor in each pyramid level of the PNP pyramid will be conductively biased to set up a current path between ground terminal 32 and one of its output lines. The sixteen translator output lines plus those provided for space, carriage return, and null, selected as will hereinafter appear, are labelled in FIGURE 3 with the code combinations which cause them to be selected (the overlined bits representing a not "one" bit condition on an associated line 9).

Referring particularly to FIGURE 4 there is shown the keypuller solenoid matrix 27 comprising the row and column conductors 25 and 26 between selected ones of which are connected the key puller solenoids 28, only some of which are shown in full lines. Each of the 123 combination translator output lines is connected to an associated AND gate 34 whose output is connected to similarly labelled row conductors 25 of the matrix while each of the 467 combination translator output lines is connected directly to similarly labelled column conductors 26 of the matrix. Each of the AND gates 34 comprises a relay winding 35 connected to an associated translator output line and to ground. Each relay is adapted to operate a switch contact 36 whereby the 123 row conductor associated therewith will be connected to a common line 37 which, when it assumes a negative potential as will hereinafter appear, permits current to flow from ground terminal 32 through the PNP translator, the selected 467 column conductor 26, and to the selected 123 row conductor 25 via the solenoid 28 connected between them.

With reference to FIGURES 3 and 4, assuming the common line 37 is negative and a code representing letter W, i.e. $\overline{1}23\overline{4}6\overline{7}$ is on lines 9 the 2, 3, and 6 buffer flip flops 33 would be set whereby terminals A and B thereof would reverse polarity from the normal polarities indicated in FIGURE 3. This condition will cause the negative source 31 to be connected via now conductive transistors 38, 39 and 40 in the NPN pyramid to the $\overline{1}23$ output line thereof thereby energizing the relay 35 in the associated AND gate 34. This condition will also connect ground terminal 32 to output line $\overline{4}6\overline{7}$ via transistors 41, 42 and 43 of the PNP pyramid whereby current will flow from terminal 32 through transistors 41, 42 and 43 of the PNP pyramid, the $\overline{4}6\overline{7}$ column conductor, the W solenoid connected between the $\overline{1}23$ and $\overline{4}6\overline{7}$ conductors, contact 36 of the AND gate 34 to negative line 37.

The space, carriage return and null codes are represented by combinations $\overline{12345678}$, $\overline{12345678}$ and 12345678. Three additional column conductors are employed in the keypuller solenoid matrix to accommodate these functions. These conductors are labelled $\overline{4675}$, $\overline{4678}$ and 4678. The space and carriage return solenoids are connected between the $\overline{123}$ and the 4675 and $\overline{4678}$ conductors respectively, while the null solenoid is connected between the 123 and 4678 conductors. Referring again to FIGURE 3 the B terminal of the 5 bit buffer flip flop 33, which reverses polarity when set by a 5 bit, is connected to the base of a PNP transistor space AND gate 44 whose emitter is connected to the $\overline{467}$ translator output line and whose collector is connected to column conductor $\overline{4675}$. The coincidence of the $\overline{467}$ and the 5 bit, if a $\overline{123}$ condition also obtains will cause current to flow from ground terminal 32 through the PNP pyramid, output $\overline{467}$ thereof, transistor AND gate 44, column conductor $\overline{4675}$, the space solenoid, row conductor $\overline{123}$, and to negative line 37. The carriage return and null codes are similarly translated through transistor AND gates 45 and 46 respectively.

As shown in FIGURE 4 the 123 translator output lines associated with carriage return, and with tab and back space are also directly connected via lines 47 and 48 respectively to carriage return and tab AND gates 51 and 52 (FIGURE 5) for reasons which will hereinafter appear.

Referring to FIGURE 5 the matrix row and column conductors representing lower case i.e. $\overline{123}$ and 467 and upper case $\overline{123}$ and 467 are connected to lower and upper case shift AND circuits 53 and 54 respectively. The outputs of these AND gates control a shift memory circuit 55 whereby the shift solenoid 28 is energized to effect an upper case shift and de-energized to effect a lower case shift. The lower case AND gate 53 comprises a relay 56 one end of which is connected to the 467 column conductor and the other end of which is connected to the $\overline{123}$ row conductor. This relay when energized operates a normally closed switch 57 whose movable contact is connected to ground and whose stationary contact is connected to the movable contact of a normally open hold switch 58 operated by a shift relay 61. The stationary contact of the hold switch 58 is connected to one side of the shift solenoid 28 whose other side is connected to a negative source terminal. The upper case AND gate 54 also comprises a relay 62 similarly connected to the $\overline{123}$ and 467 lines and operates a normally open switch 63 whose fixed contact is connected to ground and whose movable contact is connected to the fixed contact of the shaft relay switch 58 and to one side of the shift relay 61 whose other side is connected to a negative source terminal. The shift solenoid 28 and relays 56, 61 and 62 are de-energized in lower case operation.

When an upper case code is translated the upper case relay 62 will close switch 63 causing a current to flow from ground to negative source terminals via the shift solenoid 28 and shift relay 61. The latter will close hold switch 58 and complete a hold circuit to ground through the normally closed switch 57 controlled by the lower case relay 56. When a lower case code is read the switch 57 controlled by the lower case relay 56 will open de-energizing both the shift relay 61 and shift solenoid 28. It is to be here noted that the current drawn through the upper and lower case relays 56 and 62, as the case may be, is much less than that flowing through a matrix connected solenoid as the load presented by the relays in the shift circuit is greater.

Before a key puller solenoid 28 can be energized line 37 as noted above must assume a negative potential level whereby current can flow through the circuit closed by the relay 35 of an AND gate 34. The state of line 37 is determined by the printer control circuitry 19 which comprises as shown in FIGURE 5 a slave-in-process flip flop 64, a 25 millisecond probe one-shot multivibrator 65, a one second auto recall one-shot multivibrator 66, and a 30 millisecond platen to headrest one shot multivibrator 67. With the flip-flop and multivibrators in their normal states, the output terminals A and B thereof will have the polarities illustrated in the figure.

Directing attention to FIGURE 5 the B output terminal of the slave-in-process flip flop 64 is connected via a 3 millisecond RC delay circuit 68 to the input of a NOR gate 71 as are the B terminals of the auto recall one shot and platen to headrest one shot multivibrators. The output of the NOR gate 71 is connected to the trigger terminal of the probe one shot multivibrator 65. The A output terminal of the probe one shot is connected to an emitter follower amplifier 72 whose output via probe line 20 is connected to the base of an NPN inverter 73 whose output is connected to line 37 via the primary 74 of a pulse transformer 75. The B output terminal of the probe one shot multivibrator is connected via a one millisecond RC delay circuit 76 to the base terminal of an NPN AND gate 77 whose emitter is connected to a line 78. The output of the AND gate 77 is connected to the reset terminal of the slave-in-process flip flop 64.

The secondary 81 of the pulse transformer 75 is connected to the set terminal of a printer-in-process flip flop 82 whose A output terminal, which is normally negative, is connected via printer output line 21 to an emitter follower 83 whose output in turn is connected to the trigger terminal of the auto recall one shot 66, the trigger terminal of the platen to headrest one shot 67 and to the emitter terminal of reset AND gate 77 via line 78. The A output terminal of the platen to headrest one shot 67 is connected via a diode 84 to the B output terminal of the auto recall one shot whereby when the platen to headrest one shot is set the auto recall one shot will reset as will hereinafter be explained. The printer-in-process flip flop 82 is adapted to be reset via a signal on reset line 85 after the printer has functioned and generated a feedback signal.

With the exception of the shift function every typewriter operation initiated by energization of a key puller solenoid 28 will effect a carriage movement; printing and spacing operations a single increment motion, carriage return and tabulation multiple increment motions. Feedback signals are generated in response to these carriage movements by a brush 86 which rides a commutator 87 having alternate lands 88 and valleys. The commutator 87 is secured on a shaft 89 which is rotatably supported in the machine frame. The shaft also has secured thereto a gear 91 adapted to engage and be driven by a carriage supported rack 92. As shown schematically in FIGURE 5 the commutator is connected to ground potential and the brush 86 is connected via a resistor 93 to a negative potential source. Hence when the brush is between lands 88 as it is when the carriage is at rest the brush assumes a negative potential level and when it contacts a land 88 its potential rises to ground level. The output line 94 from the brush is coupled to the emitter terminal of a PNP transistor AND gate 95 adapted to pass a reset signal to the printer-in-process flip flop 82 provided the function called is not a tabulation-backspace or carriage return.

As stated hereinbefore the 123 translator output lines 47 and 48 which define carriage return and tabulation and backspace are connected to AND gates 51 and 52. More particularly these 123 output lines are connected to the base terminals of PNP transistors comprising the AND gates 51 and 52. The 467 column conductors defining carriage return, tab and back space are connected to the emitters thereof of AND gates 51 and 52. AND gates 51 and 52 will therefore conduct in response to a tab-backspace or carriage return code as the case may be, which event will drive the collectors thereof to ground. The collectors of AND gates 51 and 52 are connected to an OR circuit 96. The output of the OR circuit is connected to the base terminal of transistor AND gate 95 which will conduct, if AND gates 51 and 52 are closed, in response to a positive feedback pulse and thereby reset the printer-in-process flip flop 82 coincident with the leading edge of feedback pulse. As the tab or carriage return AND gate 51 or 52, will open in response to a carriage return or tab, as the case may be, AND gate 95 will be blocked and will not pass the feedback pulse. The positive pulse passed by the tab and carriage return AND gates however is also coupled via OR circuit 96 to a NOR circuit 97 together with the feedback pulse whereby both inputs to the NOR circuit 97 will be positive when the feedback pulses are generated during carriage movement. This coincidence of positive inputs will cause the NOR circuit output to swing positive in response to each feedback pulse generated. The series of pulses passed by the NOR gate 97 is integrated by a capacitor 98 and the positive going leading edge of the integrated series of pulses is applied to a PNP transistor amplifier 101 having a relay 102 in its collector circuit. Transistor 101 will conduct when the integrated pulses go negative i.e. the trailing edge thereof, thereby to close relay contacts 103 to provide a discharge path for a capacitor 104 whereby a positive pulse developed across resistor 105 is passed to the reset line of the printer-in-process flip flop 82.

When the printer in process flip flop 82 resets the negative pulse on the A terminal thereof will trigger the platen to headrest one shot multivibrator 67 whose A terminal output will reset the auto recall one shot 66 and whose B terminal output will block the NOR gate 71 over its active period to permit the mechanical action sufficient time to return to rest position.

As heretofore stated the current drawn through the transformer 75 is not sufficient to set the printer-in-process flip flop 82 when a shift function is called. As the mechanics of shifting requires longer than the probe time of 25 milliseconds the output of the lower and upper case shift AND gates are also connected via line 106 and an OR circuit 107 to the trigger terminal of the platen to headrest one shot; the output of the lower case gate via an inverter 108 and the output of the upper case gate directly whereby at the end of the 25 millisecond probe and the return to normal of contacts 57 and 63, as the case may be, the negative going pulse will set the platen to headrest one shot which will block NOR gate 71 to provide an additional 30 milliseconds for the shift action.

Figure 1:
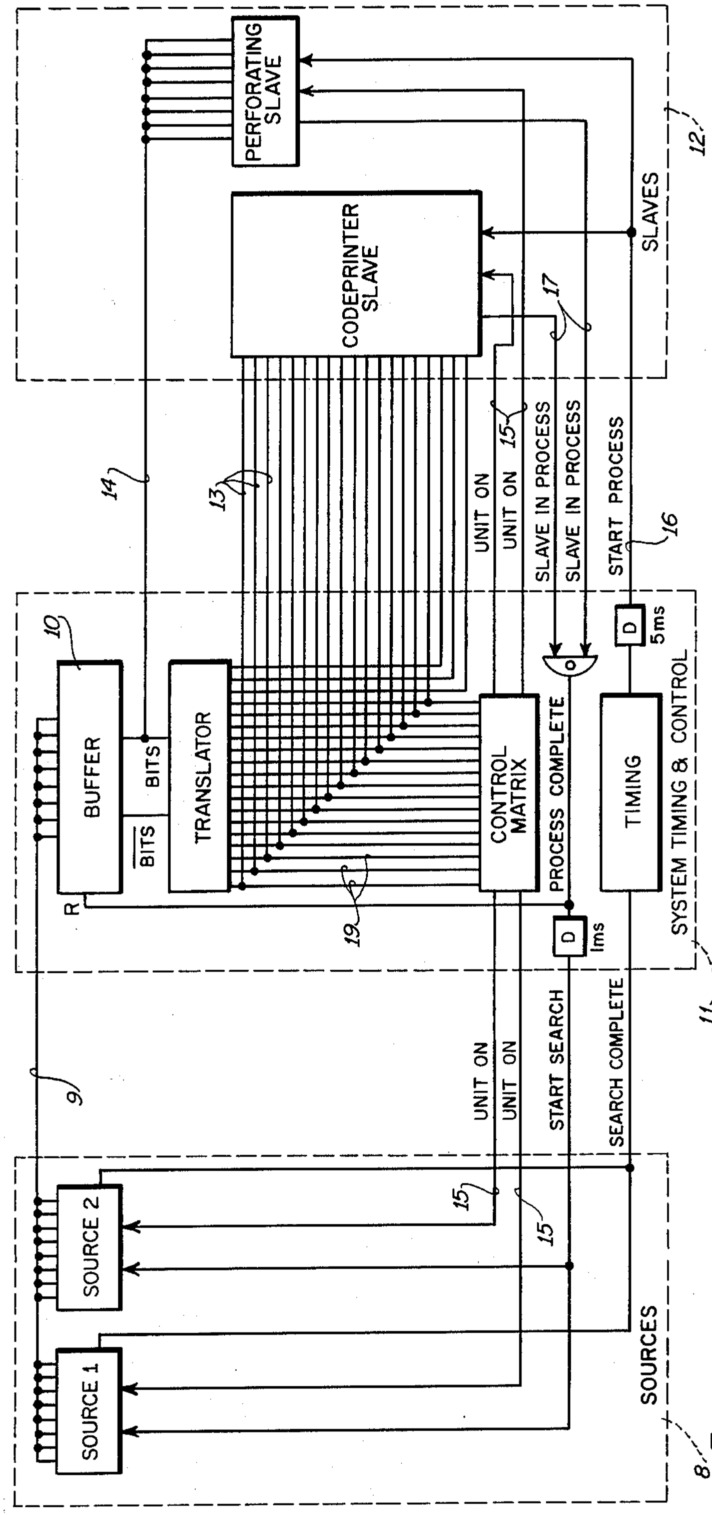
FIGURE 1 is a block diagram of a data processing system.

With reference to the timing diagrams shown in FIGURE 6 wherein the curves show the state (positive or negative) of selected lines in the circuit diagrams with respect to time, curve 111 shows the state of the in process line 17 associated with the B output terminal of the slave-in-process flip flop, curve 112 shows the state of the start search and search complete lines connected to and emanating from a reader source unit (FIGURE 1) respectively, curve 113 shows the state of the buffer storage unit output lines, curve 114 shows the state of the start process line 16, curves 115 and 115A show the state of the probe one shot multivibrator output terminals, curve 116 shows the state of the printer-in-process flip flop output terminal, curves 117 and 118 show the state of the auto recall and platen to headrest one shot multivibrator output terminals B, curve 119 shows the state of the feedback generator output line, and curves 120 and 121 show respectively the current drawn by a keypuller solenoid and the motion of a type bar.

The operation of the apparatus in response to code signals issued by a reader and representative of a type action may be followed with reference to FIGURES 1, 3–5 and 6. Assuming that the codeprinter apparatus and a reader are both turned on at time $t_0$, the negative state of the slave-in-process line 17 will automatically effect the generation of a positive process complete signal (not illustrated) in the system control circuitry 14 which in turn will initiate a start search signal (curve 112) to the reader. Simultaneously the search complete line will go positive and the buffer flip flops will be set. At time $t_1$ approximately five milliseconds after receiving the search complete signal the system timing and control circuitry 14 will generate a start process signal (curve 114) of 7.5 milliseconds duration to the printer control circuitry. The five milliseconds delay is provided to permit the buffer flip flops to settle and time for a selected relay of an AND gate 34 to operate its contact. The 7.5 millisecond start process signal will, since "unit on" line 15 is also positive, pass an AND gate 124 and emitter follower and set the slave-in-process flip flop 64 whereby line 17 connected to its output terminal will go positive thereby, via the system control circuitry reversing the state of the start search and search complete lines as well as the code lines 9 from the source. The buffer flip flops set in the $t_0$–$t_1$ interval however remain set and the output lines therefrom are operative via translators 23 and 24 to select a matrix row and column conductor as hereinbefore explained. The positive signal (curve 111) on the output terminal B of the slave-in-process flip flop 64 is also connected, as hereinbefore noted via a delay circuit 68 to provide an additional two milliseconds for a selected relay 35 in an AND gate 34 to operate, to the NOR gate 71. As the A and B terminals of the auto recall and platen to headrest one shot multivibrators are also positive at time $t_1$ the NOR gate output will go positive and set the probe one shot multivibrator 65 two milliseconds later at time $t_2$ which will remain active for 25 milliseconds.

The positive pulse on the A terminal of the probe one shot multivibrator 65 is coupled through emitter follower 72 to probe line 20 which is connected to the base of inverter 73 whereby a negative pulse is developed on its collector. This negative pulse is connected to translator probe line 37 via the pulse transformer primary 74. As the translator has already selected a row and column conductor the probe signal will energize a key puller solenoid 28 at time $t_2$ as shown by current curve 120. At time $t_3$ approximately 12 milliseconds after the solenoid is energized, a pawl or cam will engage the typewriter power roll and effect a type action as indicated by motion curve 121. When, at time $t_4$ the probe one-shot multivibrator 65 returns to quiescent state, the negative going trailing edge of the pulse on its A terminal induces a positive pulse in the transformer secondary 81 thereby setting the printer-in-process flip flop at time $t_4$. As the output terminal of the printer-in-process flip flop is coupled over line 21 and through an emitter follower 83 to the trigger terminal of the auto recall one shot multivibrator 66, the latter is triggered when the printer-in-process flip flop is set. When the auto recall one shot is triggered the state of its output terminal goes negative as shown by curve 117 thereby reversing the output of NOR gate 71. Also at time $t_4$ the solenoid circuit is opened. It is here to be noted that during the 25 millisecond cycle of the probe one shot 65, AND gate 77 cannot gate the positive pulse on the B terminal thereof which occurs when the latter resets, as when this occurs the printer-in-process flip flop 82 having been set at time $t_4$ by the trailing edge of the probe signal on terminal A impresses a positive potential on the emitter terminal of the AND gate 77. The one millisecond delay provided by circuit 76 is to assure that the printer-in-process flip flop 82 has time to set before the positive pulse on the B terminal is applied to the AND gate 77.

Assuming that the typewriter action is not a tab, backspace or carriage return but rather a type bar action as illustrated, then after the bar has printed at time $t_5$ the carriage will escape and generate a positive feedback pulse at time $t_6$ of approximately 6 milliseconds duration. The leading edge of this pulse will pass AND gate 95 and reset the printer-in-process flip flop 82 whereupon terminal A thereof will go negative. When this occurs the negative signal will cause AND gate 77 to pass a negative reset pulse to the slave-in-process flip flop 64 whereupon line 17 (curve 111) will go negative indicating a process complete condition. Also at time $t_6$ the negative going pulse on terminal A of the printer-in-process flip flop 82 will trigger the platen to headrest one shot 67 whereupon its A terminal will go positive thereby resetting the auto recall one shot multivibrator 66; its now negative B terminal maintaining the NOR gate 71 blocked over its active period of 30 milliseconds.

The reversal of the slave-in-process line at time $t_6$ is operative within the system as hereinbefore stated to reset the buffer flip flops and after a one millisecond delay, to generate another start search signal at time $t_7$ whereby subsequent code signals and a search complete signal can issue from the source which when the source is a reader occurs immediately. Hence the buffer flip flops are again selectively set at time $t_7$ and a subsequent start process issues at time $t_8$ and sets the slave-in-process flip flop 64. As the NOR gate 71 is blocked over the 30 millisecond period of the multivibrator 67 however, the probe one shot multivibrator 65 cannot be set and no probe signal issues therefrom at this time. When the platen to headrest one shot multivibrator returns to its quiescent condition at time $t_9$ and its B terminal goes positive, the NOR gate output immediately goes positive and sets the probe one shot 65 whereupon the code in the buffer unit is processed as before. As evident from FIGURE 6, the delay provided by the platen to headrest multivibrator permits the type bar time to return to rest position before the next code in the buffers can be processed.

When a tabulation or carriage return function is stored in the buffers, a key puller solenoid 28 will be energized over the interval between $t_2$ and $t_4$ and initiate a carriage motion; carriage motion conmmencing at $t_3$ whereby a series of feedback pulses will be generated. The length of the feedback pulse train and the widths of the pulses (1.5–6 milliseconds) in the train will vary depending on the distance and speed of carriage travel. Carriage movements require longer times to be accomplished than regular escapement motion e.g. movement of a 14″ carriage over its full length of travel may require up to a full second. Shorter distances will require less time. As noted hereinbefore the 123 translator output lines 47 and 48 associated with tab, backspace and carriage return are directly connected to associated tab and carriage return AND gates 51 and 52 which will therefore pass a positive pulse for as long as the buffers remain set. The positive output of the AND gates 51 or 52 will block gate 95 and condition NOR gate 97 to pass the series of positive feedback pulses. These pulses are then integrated and the trailing edge of the train is employed to reset the printer-in-process flip flop 82 as hereinbefore described.

When the code signals in the buffer unit 10 results in the selection of row and column conductors between which no key puller is connected, or if a shift code is in the buffer unit, the printer-in-process flip flop 82 will not be set as no current will be drawn through the matrix in the former case, and insufficient current in the latter case to induce a pulse in the transformer secondary 81 of sufficient amplitude to set the printer-in-process flip flop 82. In the former of these events the slave-in-process flip flop 64 will be reset when the probe one shot returns to quiescent condition; AND gate 77 being conductive due to the application thereto of the positive signal on terminal B of the probe one shot and the negative signal on terminal A of the printer-in-process flip flop 82.

If the printer-in-process flip flop 82 is set as explained above, and for some reason the printer did not function properly e.g. did not print, the carriage will not have escaped with the result that no feedback pulse will be generated. In this circumstance, since the printer-in-process flip flop 82 will not be reset, the platen to headrest one shot multivibrator 67 cannot be set. The auto recall one shot multivator 66 will therefore go its full one second period after which it will reapply ground to the NOR gate 71, and, since the slave-in-process flip flop 64 was not reset, another pulse will be applied to the trigger terminal of the probe one shot multivibrator 65 whereby the matrix 27 is again probed to operate the solenoid 28 selected by the code still in the buffer unit, the latter remaining set until the slave-in-process has reset and initiated a process complete signal in the control circuitry 11.

When a keyboard is the emitting source the auto recall and platen to headrest one shots are rendered nonresponsive to in process signals by an applied negative clamping potential on a line 122. This is to permit the printer to operate at its normal rate and at the rate of the keyboard operator. If a character is dropped when the keyboard is on it can be recalled by the use of an interrogate switch 123 on the keyboard which reactivates the probe one shot multivibrator 65.

As hereinbefore stated several matrices i.e. system control matrices and solenoid matrices, for reasons of economy, share a common translator which is adapted to feed control matrices in the system timing and control circuitry whereby the selection of a source and slaves is effected, as well as keypuller solenoid matrices in the printers.

With reference to FIGURE 7 a printer A and a printer B designated 18A and 18B each including keypuller solenoid matrices and associated printer-in-process flip flops, feedback generators and shift, tab and carriage return circuitry as hereinbefore described, are fed by the nineteen output lines 13 from the translator of FIGURE 3 and controlled by a common printer control circuitry 19 from which as hereinbefore described a probe signal issues to probe line 20. Probe line 20 is connected to one leg of an AND gate 126 whose other leg is connected to the printer B in process line 21B. Probe line 20 is also connected to one leg of an AND gate 127 whose other leg is connected to the printer A in process line 21A. AND gates 126 and 127 may comprise PNP transistors whose emitters are connected to the probe line and whose bases are connected to the in process lines 21. The output from the collectors of AND gates 126 and 127 respectively drive associated inverters 73A and 73B of printers 18A and 18B whereby lines 37A and 37B therein are driven negative as described above. When two printers are employed the lower side of relays 35 in AND gates 34 are not normally grounded but rather are connected to printer "unit A on" line 15A and printer "unit B on" line 15B as shown in FIGURE 7.

The "unit on" lines 15A and 15B are also connected to an OR circuit 128 whose output is connected to AND gate 124 together with the start process signal on line 16 as before. As is apparent from the above either one or both printers may be operated as either one will cause a probe signal to issue in a manner hereinbefore described. Where only one printer unit is selected, e.g. 18A, via line 15A, the AND gates 34B in the matrix of the other printer 18B will not be conditioned for operation by a 123 signal. Further as shown in FIGURE 7 the printer A and B in process lines 21A and 21B are also connected to an OR circuit 130 whose output is connected to emitter follower 83 in the printer control circuitry. Further the shift signals on lines 106A and 106B (not shown) are also ORed and connected over line 131 to OR gate 107 in order to set the platen to headrest multivibrator as hereinbefore described. As is apparent then, when both printers are operated simultaneously, the slowest to operate will control the platen to headrest multivibrator 65.

If one printer does not function and the other does function e.g. printer B functions while printer A does not, the printer A in process flip flop will not be set and the auto recall multivibrator 66 will to its full period. At the end of the auto recall multivibrator period another probe signal will issue from the probe multivibrator 65. The probe signal however will only pass gate 126 to printer A as gate 127 will be blocked by the positive signal level on the still set printer A in process flip flop output terminal connected to line 21A. Hence printer A will be probed a second time to process the data in the buffers.

It should be understood that the foregoing disclosure relates to only a preferred embodiment of the invention and that it is intended to cover all changes and modifications of the example of the invention herein chosen for the purposes of the disclosure which do not constitute departures from the spirit and scope of the invention.

The invention claimed is:

1. Codeprinting apparatus comprising a typewriter operable in response to start process signals to process code signals representative of discrete typewriter functions, a plurality of solenoids adapted when individually energized to initiate the operation of a discrete typewriter action, means responsive to code signals for selecting one of said solenoids, means responsive to said start process signal for energizing a selected solenoid whereby the operation of a typewriter action is initiated, means responsive to said last named means for generating an in process signal the termination of which permits the selection of another solenoid in response to subsequent coded signals, and means responsive to the functioning of said typewriter action for terminating said in process signal.

2. Codeprinting apparatus comprising a typewriter operable in response to start process signals to process code signals representative of discrete typewriter actions, a plurality of solenoids adapted when individually energized to initiate an associated action in said typewriter, means responsive to code signals for selecting one of said solenoids, means responsive to a start process signal for generating a probe signal of predetermined duration for energizing a selected solenoid, means responsive to the termination of said probe signal for generating an in process signal adapted to prevent the release of subsequent coded information, means responsive to the completion of the function of the typewriter action for terminating said in process signal, and means responsive to said in process signal and operative on said probe signal generating means for automatically effecting the generation of another probe signal whereby said selected solenoid is again energized in the event of failure of a selected typewriter action to function properly.

3. Codeprinter apparatus adapted to print out information represented by code signals in response to start process signals comprising first bistable means adapted when in a normal state to permit the release of code signals from a source unit, said means being operative to its other than normal state by start process signals initiated subsequent to the release of said code signals, means for storing code signals released from said source unit until said first bistable means changes from its other than normal to normal state, a typewriter, a plurality of solenoids, code translating means responsive to stored code signals to select a discrete solenoid, a one shot multivibrator having a predetermined active period operable to its active state in response to the change of said bistable means to its other than normal state to energize a selected solenoid whereby a typewriter action is initiated, feedback signal generating means responsive to the functioning of said typewriter action, a second bistable means operative to its other than normal state in response to the change of said multivibrator from its active to quiescent state and operative back to its normal state in response to a feedback signal, and means responsive to the output of said multivibrator when in a quiescent state and to the output of said second bistable means when in its normal state for resetting said first bistable means to its normal state.

4. Codeprinter apparatus as recited in claim 3 further comprising means responsive to the operation of said second bistable means to its normal state for preventing the operation of said one shot multivibrator by said first bistable means for a period of time sufficient for said typewriter action to be completed.

5. Codeprinter apparatus as recited in claim 3 further comprising second and third multivibrators having predetermined active periods, means for rendering said second multivibrator active in response to operation of said second bistable means to its other than normal state, said second multivibrator adapted at the end of its period to retrigger said first one shot multivibrator in the event the type action operated failed to generate a feedback signal thereby to re-energize the selected solenoid, means for rendering said third multivibrator active in response to the operation of said second bistable means to its normal state, means for returning said second multivibrator to quiescent state prior to its normal period in response to the operation of said third multivibrator to active state, and means for preventing the operation of said first one shot multivibrator by said first bistable means when either of said second and third multivibrators are active.

6. Codeprinting apparatus adapted to print out information represented by code signals in response to start process signals, first bistable means operative in its reset state to effect the release of code signals from a source unit, said first bistable means being operable to a set state in response to said start process signals generated subsequent to the release of code signals, means for storing said code signals, a typewriter, action initiating solenoids, means responsive to stored signals for conditioning one of said solenoids for operation, means operative over a predetermined interval in response to the setting of said first bistable means for energizing the conditioned one of said solenoids whereby an associated typewriter action is initiated.

second bistable means operative to a set state at the end of said interval, means responsive to the functioning of said typewriter action for resetting said second bistable means, and gate means conditioned to pass a reset signal to said first bistable means when said second bistable means resets.

7. Codeprinter apparatus adapted to type out information represented by code signals in response to start process signals generated subsequent to said code signals, said apparatus comprising a printer having a carriage and a plurality of type action initiating solenoids, means responsive to code signals for conditioning a selected one of said solenoids, means operative over a predetermined interval in response to said start process signal for energizing a conditioned solenoid, bistable means operative to a set state at the end of said interval adapted when reset to permit the release of subsequent code signals, signal generating means responsive to the movement of said carriage initiated by the functioning of the action initiated by said solenoid, first gate means responsive to a signal generated by a single increment carriage movement for resetting said bistable means, and second gate means responsive to the termination of signals generated by multiple carriage movements for resetting said bistable means.

8. Codeprinter apparatus adapted to print out information represented by code signals in response to start process signals generated subsequent to said code signals, said apparatus comprising at least one printer having a carriage, a plurality of printer action initiating solenoids, a printer flip flop and a carriage controlled signal generator operable in response to carriage movements, printer control circuitry comprising a control flip flop and a one shot multivibrator, means responsive to code signals for selecting a solenoid, gate means operative in response to the setting of said control flip flop by a start process signal for triggering said one shot multivibrator, means responsive to the output of said multivibrator for energizing a selected solenoid, means for setting said printer flip flop at the termination of said one shot multivibrator period, first gate means operative to gate the leading edge of a signal generated in response to single increment carriage movements associated with printing actions for resetting said printer flip flop, and means operative to gate the trailing edge of signals generated in response to multiple increment carriage movements associated with tabulation and carriage return actions for resetting said printer flip flop, and means for resetting said control flip flop when said printer flip flop is reset.

9. Codeprinting apparatus comprising a typewriter for typing out information represented by code signal patterns in response to start process signals generated subsequent to said code signal patterns, a plurality of solenoids adapted when individually energized to initiate operation of an associated typewriter action, translator means responsive to said code signal patterns for selecting a discrete circuit through a solenoid corresponding to the typewriter action represented by each code signal pattern, means responsive to each start process signal for generating a signal of predetermined duration thereby to energize the solenoid in a selected circuit,.

means responsive to the termination of said signal of predetermined duration for generating a control signal the termination of which is adapted to permit the generation of a subsequent code signal pattern and a start process signal, means responsive to the operation of a discrete typewriter action for generating a feedback signal operative on said last named means to terminate said control signal, and means responsive to the termination of said control signal for delaying a subsequent start process signal over an interval of predetermined duration to assure completion of said typewriter action.

10. A codeprinter comprising a typewriter for typing out information respresented by code signal patterns in response to start process signals generated subsequent to said code signal patterns, typewriter action initiating solenoids, a translator responsive to code signal patterns for setting up discrete circuit paths, said solenoids being individually connected to paths corresponding to action representative code signal patterns, monostable means operable to active state in response to start process signals for effecting current flow through selected circuit paths including a solenoid, a flip flop circuit, current detecting means responsive to current flowing in said selected circuit path operable to set said flip flop at the termination of current through said selected path, means responsive to the operation of a type action initiated by an energized solenoid for generating a feedback signal, said feedback signal being connected to reset said flip flop, and means responsive to the resetting of said flip flop to permit the generation of subsequent code signal patterns and start process signals.

11. Apparatus as recited in claim 10 further comprising means for delaying a subsequent start process signal over an interval of predetermined duration.

12. Apparatus as recited in claim 10 further comprising means for retriggering said monostable means in the event a feedback signal is not generated due to improper operation of a solenoid initated type action.

13. Apparatus as recited in claim 10 further comprising means responsive to the return to quiescent state of said monostable means to permit the generation of subsequent code signals when the selected path does not include a solenoid.

References Cited by the Examiner

UNITED STATES PATENTS

| | | | |
|---|---|---|---|
| 2,142,691 | 1/39 | Hicks | 340—347 |
| 2,910,235 | 10/59 | Southard | 340—347 |
| 2,996,577 | 8/61 | Smith-Vaniz | 178—26.5 |

NEIL C. READ, *Primary Examiner.*

MALCOLM MORRISON, *Examiner.*